(Model.)
T. L. MAXHEIMER.
FISH BONE HOLDER FOR BIRD CAGES.
No. 260,769. Patented July 11, 1882.
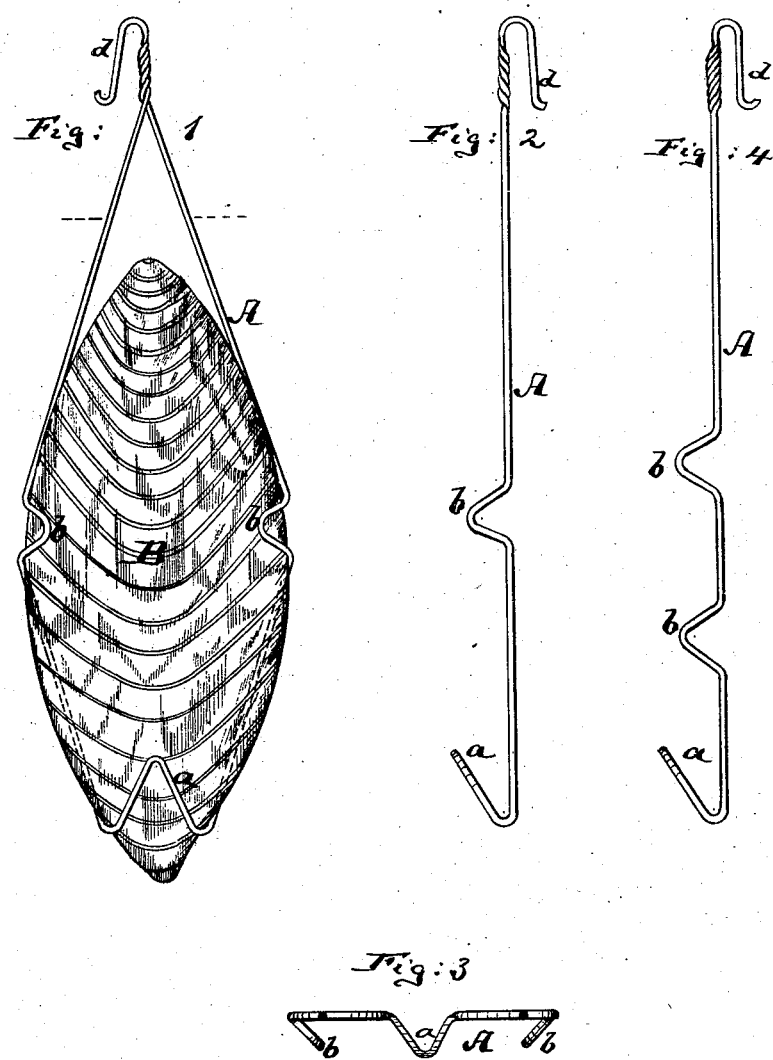
Witnesses
John G. Tunbridge
John W. Speer
Inventor:
Theodore L. Maxheimer
by his attorneys

UNITED STATES PATENT OFFICE.

THEODORE L. MAXHEIMER, OF BROOKLYN, NEW YORK.

FISH-BONE HOLDER FOR BIRD-CAGES.

SPECIFICATION forming part of Letters Patent No. 260,769, dated July 11, 1882.

Application filed May 2, 1882. (Model.)

*To all whom it may concern:*

Be it known that I, THEODORE L. MAXHEIMER, of Brooklyn, in the county of Kings and State of New York, have invented an Improved Fish-Bone Holder for Bird-Cages, &c., of which the following is a specification.

Figure 1 is a front view of my improved fish-bone holder; Fig. 2, a side view of the same; Fig. 3, a horizontal section of the same, and Fig. 4 a side view of a modification of the same.

The object of this invention is to produce a fish-bone holder which shall properly support the bone at the bottom and clasp it at the sides, and which is adapted to be suspended into a cage or wherever it may be needed for use.

The invention consists in a wire holder bent to form three or more clasps for the bone, as hereinafter more fully described, the clasps allowing the bird to reach every part of the bone, and yet holding the latter securely in place.

In the drawings, the letter A represents my improved bone-holder. The same is shown to be made of one single wire, but of course it would not be a substantial departure from my invention if the same structure were produced by uniting two or more wires together. The wire A is bent to form a large loop in form of an elongated lozenge or oval, and at the bottom the end of this loop is turned up, as shown at $a$, and at the sides the loop is turned inward, as shown at $b$, to form clasps in which the bone B is held. The upper end of the loop A is made in form of or connected with a hook, $d$, by which it can be suspended from the cage or other support. The loop thus produced is springy, and will allow the bone to be inserted and afterward to be tightly clasped by the spring action.

In Fig. 4 is shown a substantially similar device, but with more than one clasp $b$ at each side.

I claim—

The spring-holder A, constructed with the inwardly-projecting clasps $a\,b$, which are formed from the wire body of the holder, substantially as described.

THEODORE L. MAXHEIMER.

Witnesses:
SAML. R. BETTS,
HENRY F. PARKER.